United States Patent
Lashkari et al.

(10) Patent No.: US 10,174,404 B2
(45) Date of Patent: Jan. 8, 2019

(54) HYDROMETALLURGICAL PROCESS USING MULTI-STAGE NANOFILTRATION

(71) Applicant: Chemetics Inc., Vancouver (CA)

(72) Inventors: Siamak Lashkari, Vancouver (CA); Felix Mok, Vancouver (CA); Ganapathy Ramasubbu, Delta (CA); Anthony Mumba, Vancouver (CA)

(73) Assignee: Chemetics Inc., Vancouver (CA)

( * ) Notice: Subject to any disclaimer, the term of this patent is extended or adjusted under 35 U.S.C. 154(b) by 654 days.

(21) Appl. No.: 14/422,922

(22) PCT Filed: Aug. 14, 2013

(86) PCT No.: PCT/CA2013/050623
§ 371 (c)(1),
(2) Date: Feb. 20, 2015

(87) PCT Pub. No.: WO2014/029017
PCT Pub. Date: Feb. 27, 2014

(65) Prior Publication Data
US 2015/0247218 A1    Sep. 3, 2015

Related U.S. Application Data

(60) Provisional application No. 61/692,233, filed on Aug. 23, 2012.

(51) Int. Cl.
*C22B 3/22* (2006.01)
*C22B 3/44* (2006.01)
(Continued)

(52) U.S. Cl.
CPC ............ *C22B 60/0234* (2013.01); *C22B 3/02* (2013.01); *C22B 3/04* (2013.01); *C22B 3/08* (2013.01);
(Continued)

(58) Field of Classification Search
None
See application file for complete search history.

(56) References Cited

U.S. PATENT DOCUMENTS

| | | | |
|---|---|---|---|
| 4,944,882 A * | 7/1990 | Ray | B01D 61/58 210/640 |
| 2008/0069748 A1 | 3/2008 | Lien et al. | |
| 2013/0039823 A1 | 2/2013 | Bassil | |

FOREIGN PATENT DOCUMENTS

| | | | | |
|---|---|---|---|---|
| CA | 2307500 A1 * | 5/1999 | ........... | C22B 3/0005 |
| WO | 95/30471 A1 | 11/1995 | | |

(Continued)

OTHER PUBLICATIONS

International Search Report for Application No. PCT/CA2013/050623, dated Oct. 10, 2013, 3 pages.

*Primary Examiner* — Melissa S Swain
(74) *Attorney, Agent, or Firm* — Seed IP Law Group LLP

(57) ABSTRACT

Nanofiltration can be used to improve a hydrometallurgical process in which valuable metal is extracted from ore or tailings by leaching with a suitable lixiviant. The process requires at least two nanofiltration subsystems in which raffinate from a solvent extraction process is treated in a nanofiltration subsystem, after which permeate therefrom is combined with a pregnant solution stream and is treated in a second nanofiltration subsystem. This arrangement can lead to advantages in the amount of lixiviant recovered, in the raw materials required, in the effluent produced, in the size of plant, and in overall cost.

15 Claims, 8 Drawing Sheets

(51) Int. Cl.
  *C22B 60/02*    (2006.01)
  *C22B 3/02*     (2006.01)
  *C22B 3/04*     (2006.01)
  *C22B 3/08*     (2006.01)
  *C22B 4/00*     (2006.01)
  *C22B 7/00*     (2006.01)
  *C25C 1/22*     (2006.01)

(52) U.S. Cl.
  CPC .................. *C22B 3/22* (2013.01); *C22B 3/44* (2013.01); *C22B 4/00* (2013.01); *C22B 7/007* (2013.01); *C22B 60/026* (2013.01); *C22B 60/0252* (2013.01); *C25C 1/22* (2013.01); *Y02P 10/234* (2015.11)

(56) References Cited

FOREIGN PATENT DOCUMENTS

| | | | |
|---|---|---|---|
| WO | 2008/140625 | A1 | 11/2008 |
| WO | 2011/132138 | A1 | 10/2011 |
| WO | 2012/077610 | A1 | 6/2012 |
| WO | 2012/156894 | A2 | 11/2012 |

\* cited by examiner

HYDROMETALLURGICAL PROCESS USING MULTI-STAGE NANOFILTRATION

TECHNICAL FIELD

The present invention pertains to hydrometallurgical processes in which lixiviant leaching is used to extract valuable metals from ore and tailings. In particular, it pertains to improving such processes via appropriate use of nanofiltration.

BACKGROUND

Hydrometallurgical processes are commonly used to obtain valuable base metals as well as other metals from ores and tailings containing these metals. Several major operations are typically involved in such processes. Initially, a leaching of the crushed ore or tailings is performed using a lixiviant (e.g. using an aqueous acidic solution such as sulphuric acid solution) to dissolve the metal content from crushed ore or tailings and provide a leach solution comprising the desired metal or metals. The leach solution of course generally also comprises unwanted liquid and solid impurities which are desirably removed. Further, the leach solution is generally quite dilute. Thus, solution concentration and purification operations are performed to produce a more concentrated, purified solution known in the art as pregnant solution stream. Finally then, operations are performed to recover the desired metals from the pregnant solution stream.

A variety of lixiviants may be considered for such hydrometallurgical processing and the selection depends on the metal to be extracted and the type of ore or tailings involved. Aqueous acid solutions are perhaps most commonly employed as lixiviants and include solutions of such acids as sulfuric acid, hydrochloric acid, and nitric acid. Further, various arrangements are commonly considered in order to accomplish the leaching process including heap leaching, dump leaching, tank leaching and in-situ leaching arrangements.

The chemistries and equipment involved in the solution concentration and purification operations can also be quite diverse and depend on the metals and ores or tailings involved. However, a solvent extraction step is frequently employed in which an organic solvent is used to selectively extract the desired metal content from the impure leach solution to the organic phase. This is followed by a stripping of the desired metal content from the organic phase using strong acid to produce the pregnant solution stream which is a strong electrolyte or concentrated metal solution. The solvent extraction step also results in a raffinate stream or waste stream which is an aqueous solution containing low metal content with appreciable amount of residual acidity and traces of organics. The raffinate stream is commonly divided into two portions in which one portion is recycled to the leaching circuit and the other is sent to neutralization where it is treated with lime to neutralize the acidity and to precipitate the metal contents prior to discharge as effluent in order to meet environmental regulatory requirements.

The metal recovery operations separate the desired metals from the concentrated pregnant solution stream. Typical metal recovery processes include electrolytic processing (e.g. "electrowinning" or "electrorefining"), chemical precipitation, and gaseous reduction. In operations involving electrolytic processing, the pregnant solution stream serves as electrolyte in the associated electrolysis. There is generally a need to continuously bleed a proportion of the tankhouse inventory however, as "spent electrolyte", in order to prevent excess build-up of contaminants transferred from the primary leach solution and to maintain the purity of the recovered metal product. This bleed stream is commonly "disposed of" in several ways: (i) is added to the primary feed of the solvent extracting circuit where the desired metal is recovered and sent around again to the electrolytic operation; (ii) is taken directly back to the leaching circuit and cycles back through an even longer path; and/or (iii) is sent as a purge stream for metal recovery and acid neutralization prior to disposal as effluent.

There are therefore two major effluent streams that are typically generated in hydrometallurgical processes that need to be managed properly. These are the spent electrolyte stream in processes involving electrolytic processing and the raffinate stream in processes involving solvent extraction. While the common chemical (lime) treatment of the raffinate stream meets environmental standards, it unfortunately involves a series of complex precipitation and separation steps which are not only expensive to set up and operate but also which generate a large amount of gypsum solids that are often classified as hazardous materials due to its heavy metal contents and thus must be properly disposed of. Further, the acid content in the raffinate is lost and yet this is preferably recovered instead. As for spent electrolyte streams, recycling them in whole or in great part to the leaching circuit would likely overload the circuit and negatively impact the overall leaching efficiency due to its high acid and metal concentration. Further, sending them in the whole or great part to the stripping operation in a solvent extracting circuit would also affect the stripping efficiency as well as increase the capacity requirement of the overall solvent extracting circuit. And purging a side stream of spent electrolyte to metals recovery and neutralization processes would increase acid losses as well as lime consumption. There is therefore a need to better handle such effluent streams in hydrometallurgical processes. The present invention addresses this need and provides other benefits as disclosed below.

Nanofiltration is an example of a pressure driven membrane separation process in which organic molecules or inorganic ionic solutes in aqueous solutions are concentrated or separated to various degrees by the application of a positive osmotic pressure to one side of a filtration membrane. Such a pressure driven membrane process employs a cross-flow mode of operation in which only a portion of a feed stream solution is collected as a permeate solution and the rest is collected as a retentate solution. Thus, in a nanofiltration module, the exiting process stream which has not passed through the nanofiltration membrane is referred to as the "retentate" stream and the exiting process stream which has passed through the membrane is referred to as the "permeate" stream.

NF membranes reject ionic species according to the charge density of the ions and the surface charges of the membrane. Accordingly, divalent anions, such as $SO_4^{2-}$, are more strongly rejected than monovalent ones, such as $Cl^-$, and divalent cations, such as $Cu^{2+}$, are more strongly rejected than monovalent ones, such as $Na^+$. And therefore, nanofiltration can be particularly suitable for processes requiring separation of multivalent anions from monovalent ones.

Commercial NF membranes are available from known suppliers of reverse osmosis and other pressure driven membranes. The NF membranes are, typically, packaged as membrane modules. A so-called "spiral wound" module is most popular, but other membrane module configurations, such as tubular membranes enclosed in a shell or plate- and -frame type, are also known.

During the NF process, a minimum pressure equal to the osmotic pressure difference between the feed/retentate liquor on one side and the permeate liquor on the other side of the membrane must be applied since osmotic pressure is a function of the ionic strengths of the two streams. In the case of separation of a multivalent solute, e.g. $Na_2SO_4$, from a monovalent one, e.g. NaCl, the osmotic pressure difference is moderated by the low NaCl rejection. Usually, a pressure in excess of the osmotic pressure difference is employed to achieve practical permeate flux.

SUMMARY

Use of multiple nanofiltration subsystems which have been configured in accordance with the invention can provide for greater recovery of lixiviant from a concentrated waste stream in a hydrometallurgical process. This is achieved by diluting the concentrated stream supplied to one nanofiltration subsystem in the process using the dilute permeate from another nanofiltration subsystem. The invention can be used to recover more acid in hydrometallurgical processes involving acid leaching or for instance to recover more sodium carbonate in certain processes involving alkaline leaching. Further advantages include possible reductions in the amount of raw materials required, in the effluent produced, in the size of plant, and in overall cost.

The hydrometallurgical process requires at least two nanofiltration subsystems in which raffinate from a solvent extraction process is treated in a first nanofiltration subsystem, after which permeate therefrom is combined with a pregnant solution stream and is treated in a second nanofiltration subsystem. Specifically, the process is for extracting a valuable metal from a material, e.g. ore or tailings, and comprises the usual steps of leaching the material with a lixiviant to produce a leach solution of the metal and impurity solids, concentrating and purifying the leach solution to produce a pregnant solution stream in which the step of concentrating and purifying the leach solution comprises solvent extracting the leach solution to produce a metal-rich organic solution and a metal-poor raffinate, and then recovering the metal from the pregnant solution stream. In addition however, the hydrometallurgical process comprises directing at least a portion of the raffinate from the solvent extracting to the inlet of a first nanofiltration subsystem to produce a first retentate stream and a first permeate stream, then combining the first permeate stream from the first nanofiltration subsystem with the pregnant solution stream obtained either before or after recovering the metal therefrom, directing at least a portion of the combined first permeate stream and pregnant solution stream to the inlet of a second nanofiltration subsystem to produce a second retentate stream and a second permeate stream, and employing the second permeate stream in either the leaching or the concentrating and purifying the leach solution steps.

The process of the invention is suitable for operations in which the lixiviant is an aqueous acid solution. It is also suitable for extracting metals including but not limited to any base metal or combination of base metals, such as copper, nickel, cobalt, zinc, iron, lead, uranium, and radium.

While the first permeate stream is used to dilute the pregnant solution stream, the first retentate stream can be neutralized (e.g. if acidic, with lime) and the metal content precipitated for recovery after which the stream can be discharged as effluent.

One advantageous embodiment relates to a process for extracting uranium from ore using sulfuric acid in which the metal recovery operation involves chemical precipitation. Here, the hydrometallurgical process comprises counter current decanting the leach solution and impurity solids with a counter current decanting mixture comprising sulfuric acid and water to remove the solids. The first permeate stream from the first nanofiltration subsystem is then combined with the pregnant solution stream obtained before the metal recovery operation. The second permeate stream is employed in the counter current decanting mixture. And uranium is chemically precipitated from the retentate stream of the second nanofiltration subsystem, thus recovering and purifying the uranium.

A second advantageous embodiment relates to a general process in which the metal recovery operation involves electrolytic processing (e.g. electrowinning or electrorefining). Here, the hydrometallurgical process comprises combining the first permeate stream from the first nanofiltration subsystem with the pregnant solution stream obtained after the metal recovery operation. The second retentate stream is combined with the leach solution prior to the concentrating and purifying the leach solution step. And the second permeate stream is combined with the aqueous acid solution in the leaching step.

The invention includes both the aforementioned hydrometallurgical processes along with systems appropriately configured to accomplish such processes.

BRIEF DESCRIPTION OF THE DRAWINGS

FIG. 2b shows a simplified schematic of a complex nanofiltration subsystem comprising multiple nanofiltration modules for use in the second nanofiltration subsystem of FIG. 2a.

DETAILED DESCRIPTION

Figure 1:
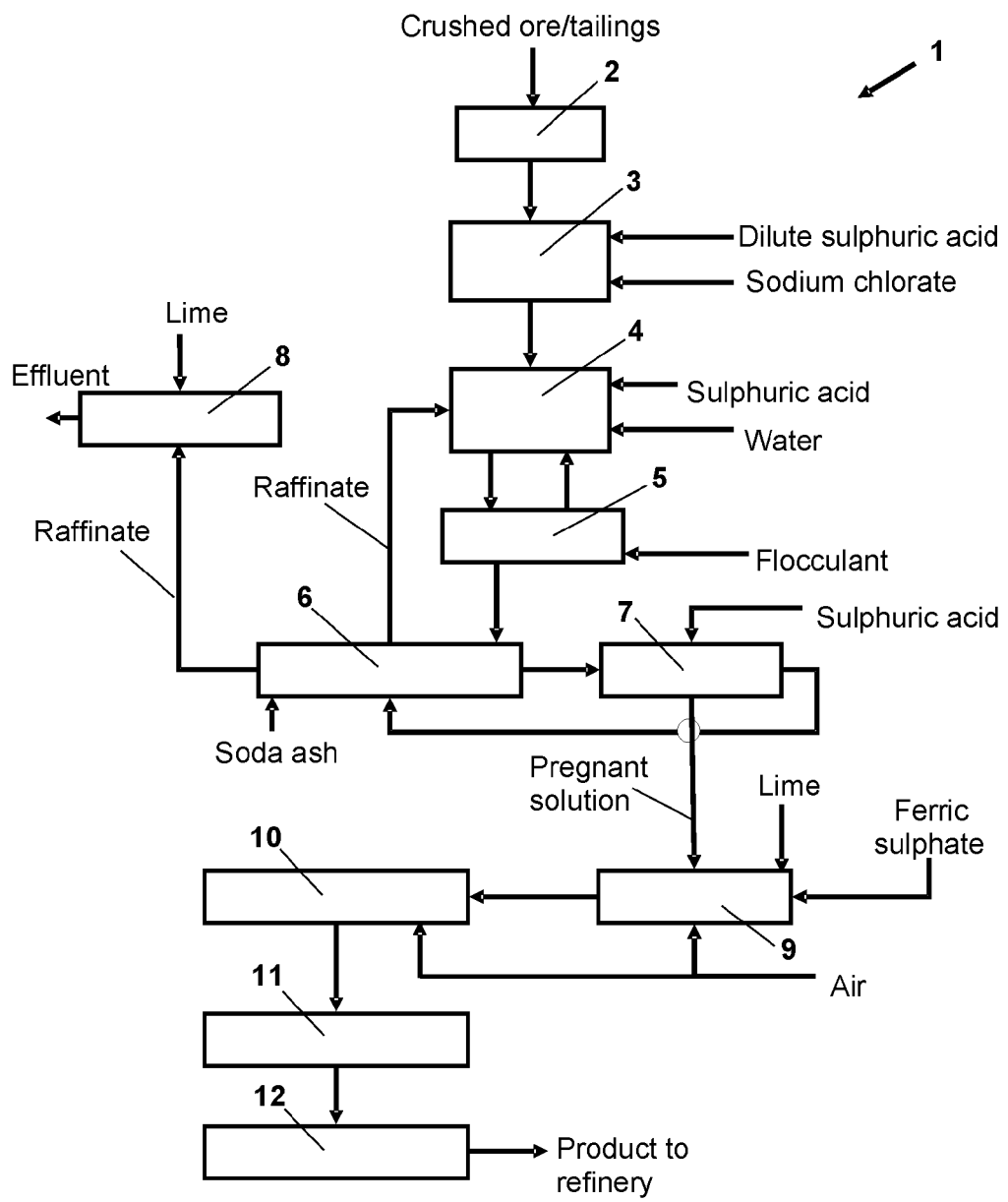
FIG. 1 shows a simplified schematic of a typical prior art hydrometallurgical process for extracting uranium from ore.

Unless the context requires otherwise, throughout this specification and claims, the words "comprise", "comprising" and the like are to be construed in an open, inclusive sense. The words "a", "an", and the like are to be considered as meaning at least one and are not limited to just one. In particular, when used in reference to the various streams or raffinates herein, the words "a", "an", and the like are to be considered as meaning at least one portion of such a stream or raffinate and are not limited to just one such portion. Thus specifically, the phrases "a raffinate", "a first permeate stream", and "a pregnant solution stream" for instance should be construed as "at least one portion of raffinate", "at least one portion of first permeate stream", and "at least one portion of pregnant solution stream" respectively.

Herein, "pregnant solution stream" refers to the process stream in a hydrometallurgical process after the solution concentration and purification operations.

"Electrolytic processing" is intended to include any metals recovery process involving electrolysis, including for instance electrowinning and electrorefining.

In addition, "pregnant solution stream after recovering the metal therefrom" refers to what is also commonly known as the spent electrolyte after electrolytic processing.

With regards to nanofiltration generally, "feed stream" refers to the solution to be subjected to nanofiltration and which is supplied to a nanofiltration module. "Retentate stream" refers to the process stream exiting a nanofiltration module which has not passed through the nanofiltration membrane. And "permeate stream" refers to the process stream exiting a nanofiltration module which has passed through the nanofiltration membrane. A "nanofiltration module" is an independent component comprising one or more nanofiltration membranes and ports for such feed, permeate, and retentate streams.

Further, in nanofiltration arrays comprising multiple nanofiltration modules, multiple modules are considered to belong to a single "stage" if they are supplied in parallel with a common feed stream. An array is considered to be "multi-stage" when the retentate stream from an upstream module is supplied as the feed stream for another module downstream. The number of stages in such an array is given by the number of modules connected in series in this manner (i.e. connected such that the retentate stream from an upstream module in the series is supplied as the feed stream to a downstream module in the series). An array is considered to be "multi-pass" when the permeate stream from an upstream module is supplied as the feed stream for another module. The number of passes in such an array is given by the number of modules connected in series in this manner (i.e. with the permeate stream from an upstream module in a series supplied as the feed stream to a downstream module in the series). More complicated arrays can be created however which incorporate elements of both of these arrangements.

The following description exemplifies several alternative embodiments of the invention. The first involves recovering lixiviant (in this case, acid) and water from the raffinate waste stream arising from a solvent extraction step and then using this dilute aqueous acid solution as a diluent to recover additional acid content from the pregnant solution stream. The other embodiments again involve recovering acid lixiviant and water from the raffinate waste stream arising from a solvent extraction step and then using this dilute aqueous acid solution as a diluent to recover additional acid content from the spent electrolyte stream from electrolytic processing.

A typical prior art hydrometallurgical process for extracting uranium from ore is shown in the simplified schematic of FIG. 1. In this process, sulphuric acid is added in multiple stages to the process liquor stream to promote leaching and purification of the valuable metals with a portion of this acid stream being continuously directed to a neutralization step where it is treated with lime before final disposal as effluent. Recovery of the sulphuric acid is only performed via return of part of the raffinate stream resulting from solvent extraction to a counter current decanting stage. Specifically, process 1 involves subjecting an appropriate ore to crushing 2 and then to acid leaching 3 using sulphuric acid in the presence of sodium chlorate oxidant to create a leach solution comprising dissolved uranium and other liquid and solid impurities. The leach solution is then purified and concentrated in several steps. Initially, counter current decantation 4 is performed using supplies of sulphuric acid, water, and raffinate from a later solvent extraction step 6. The decanted leach solution is filtered in a clarification sand filtering step 5 in which flocculant is supplied to promote agglomeration of fines to enhance separation of certain impurity solids for removal. The filtered leach solution is then directed to solvent extraction step 6. The organic phase of the leach solution after solvent extraction 6 is then subjected to a stripping step 7 which again involves the addition of sulphuric acid and creates pregnant solution stream comprising concentrated uranium in solution.

In solvent extraction step 6, the leach solution is brought into intimate contact with an immiscible organic phase containing an extractant selective to the uranium metal, such as tertiary amine in kerosene (not shown in FIG. 1). After mechanical mixing and settling, phase separation occurs between the organic phase loaded with the uranium metal (also called "pregnant extract") and the aqueous phase with low metal value (also called "barren solution"). The purified pregnant extract is then introduced to the stripping stage at step 7, where it is contacted with another aqueous solution of selected chemical composition, such as sulphuric acid, to promote transfer of the uranium metal into the aqueous phase, and thereby producing a stream called "pregnant solution stream". Solvent extraction step 6 and stripping step 7 thus produce a pregnant solution stream and a raffinate stream.

The raffinate stream is then either treated for recovery of other valuable by-products, if any (not shown in FIG. 1), or recycled to a point upstream or downstream of the solvent extraction process (recycling upstream of the solvent extraction process is shown in FIG. 1), or discharged as waste after suitable effluent treatment in neutralization step 8 (in which the raffinate is neutralized via addition of an appropriate amount of lime).

As for the pregnant solution stream, it is subjected to metal recovery processing to recover the valuable uranium therein. A first impurity precipitation step 9 is performed which involves the addition of lime, ferric sulphate, and air to the pregnant process stream. Thereafter, a second impurity precipitation step 10 is performed, after which the uranium is itself precipitated out in uranium precipitation step 11. The uranium metal is dried and packed at step 12 and is ready for shipping to a refinery or other.

Figure 2:
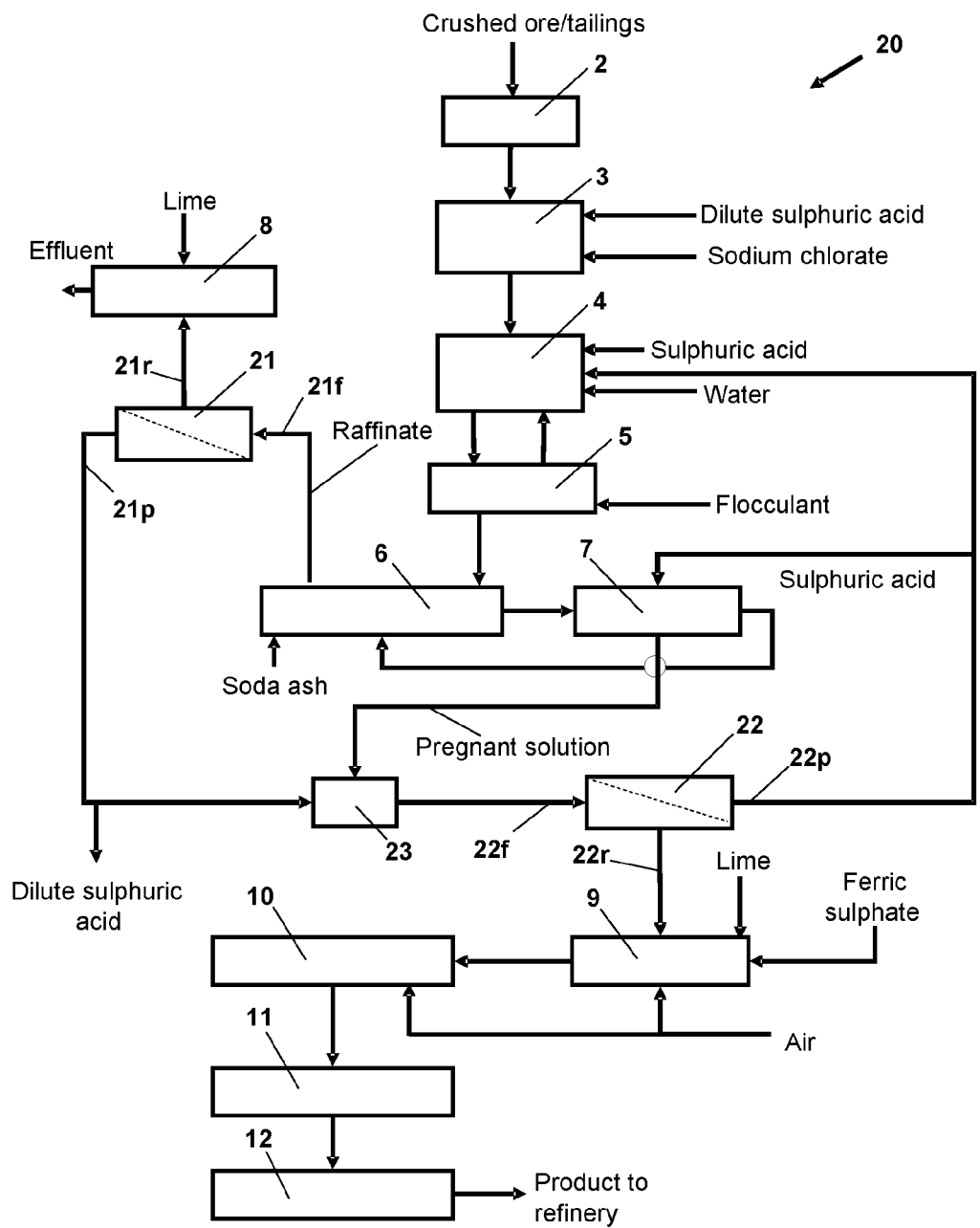
FIG. 2 shows a simplified schematic of a hydrometallurgical process of the invention for extracting uranium from ore.

FIG. 2 shows an improved version 20 of the process of FIG. 1 for purposes of extracting uranium from ore. In the simplified schematic of FIG. 2, two nanofiltration steps 21, 22 are employed. (The process steps common to FIG. 1 are identified with the same numerals.) Here, all the raffinate from solvent extraction step 6 is supplied as feed stream 21$f$ and subjected to nanofiltration at step 21. The retentate stream 21$r$ is then disposed of after neutralizing at step 8. The permeate stream 21$p$ from nanofiltration step 21 is combined and mixed with the pregnant solution stream at combining/mixing step 23, and thereby substantially dilutes the pregnant solution stream to produce a mixture of lower acid and metal contents. Next, the diluted pregnant solution stream is supplied as feed stream 22$f$ and undergoes nanofiltration at step 22. The retentate stream 22$r$ from nanofiltration step 22 continues on to the metal recovery operations while the permeate stream 22p is recovered and used as fluid in the counter current decanting step 4 and/or as a supply of sulphuric acid for stripping step 7.

Figure 2A:
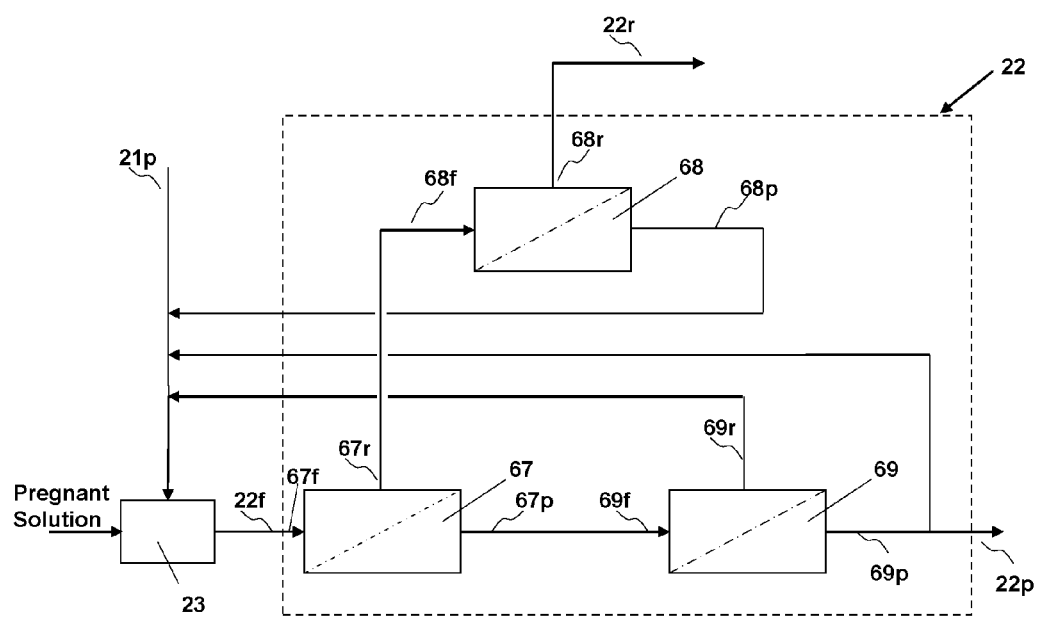
FIG. 2a shows a simplified schematic of a second nanofiltration subsystem comprising multiple nanofiltration modules for use in the second nanofiltration step of the hydrometallurgical process of FIG. 2.
Figure 2B:
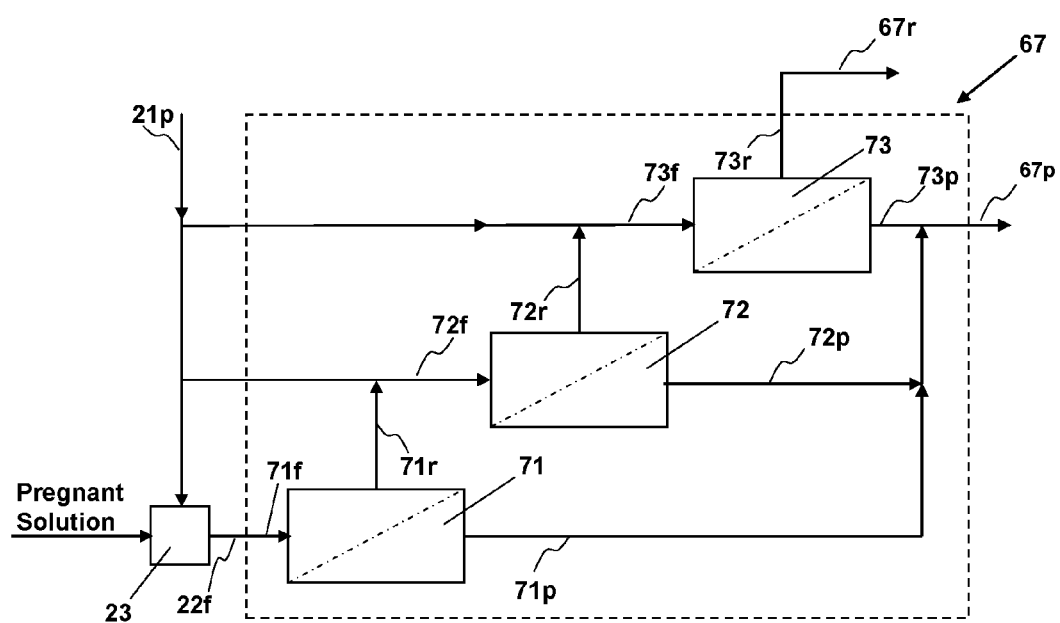

Those skilled in the art will appreciate that many variations are possible regarding the simplified schematic of process 20 shown in FIG. 2. Either of nanofiltration steps 21, 22 may involve single or multiple pass and/or single or multiple stages of nanofiltration in order to recover acid in the desired quality required and to reject metals like uranium, radium, and other multivalent cations. For instance, FIGS. 2a and 2b depict some of the many potential subsystems which might be used to accomplish nanofiltration step 22. For instance, FIG. 2a shows a simplified schematic of an optional second nanofiltration subsystem comprising multiple nanofiltration modules for use in nanofiltration step 22. (In FIG. 2a, like numerals have been used to denote elements in common with FIG. 2.) Here, nanofiltration step 22 (dashed box in FIG. 2a) is accomplished by a somewhat complex array of nanofiltration modules 67, 68 and 69 each having their own respective feed streams 67f, 68f, and 69f, their own respective permeate streams 67p, 68p, and 69p, and their own respective retentate streams 67r, 68r, and 69r. As shown, nanofiltration modules 67 and 69 are arranged in a double-pass configuration, and nanofiltration modules 67 and 68 are arranged in a double-stage configuration (since retentate stream 67r is supplied as feed stream 68f). As illustrated in FIG. 2a, permeate stream 68p, a portion of permeate stream 69p, and retentate stream 69r may optionally be recycled to permeate stream 21p.

Further still, the aforementioned nanofiltration modules can themselves be somewhat complex subsystems, comprising single or multiple pass and/or single or multiple stages of nanofiltration. For instance, FIG. 2b shows a simplified schematic of an optional complex nanofiltration subsystem comprising multiple nanofiltration modules which serve the function of nanofiltration module 67 in FIG. 2a. (Again in FIG. 2b, like numerals have been used to denote elements in common with FIGS. 2 and 2a.) Here, nanofiltration module 67 (dashed box in FIG. 2b) is a somewhat complex array of nanofiltration modules 71, 72 and 73 each having their own respective feed streams 71f, 72f, and 73f, their own respective permeate streams 71p, 72p, and 73p, and their own respective retentate streams 71r, 72r, and 73r. Here, nanofiltration modules 71, 72 and 73 can be viewed as arranged in a triple-stage configuration since retentate stream 71r is supplied as a portion of feed stream 72f, and retentate stream 72r is supplied as a portion of feed stream 73f. However, all three feed streams 71f (equivalent to 220, 72f, and 73f also comprise a portion of pregnant solution and a portion of 21p, thus the nanofiltration modules 71, 72, and 73 presented here are part of a complex system which could be viewed either as a multi-stage or a multi-pass configuration. In FIG. 2b, retentate stream 73r is equivalent to retentate stream 67r from nanofiltration module 67 in FIG. 2a. However, permeate streams 71p, 72p, and 73p are combined to become permeate stream 67p in FIG. 2a.

Figure 2C:
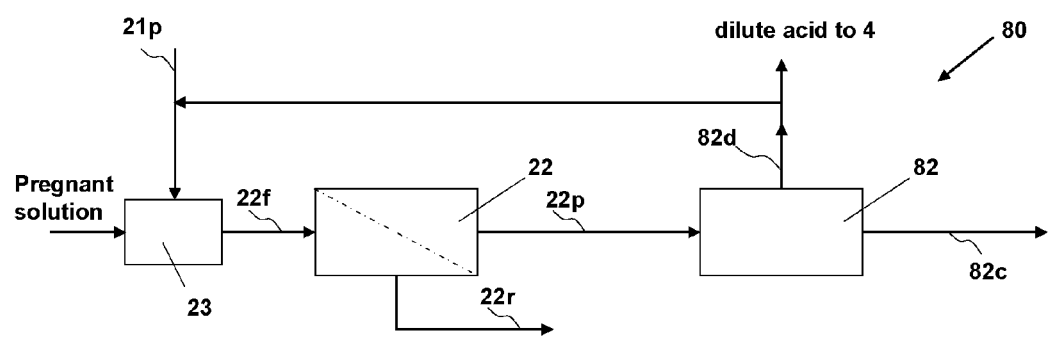
FIG. 2c shows a simplified schematic of a portion of the hydrometallurgical process of FIG. 2 comprising an optional additional step for concentrating the permeate from the second nanofiltration subsystem.

Those skilled in the art will also appreciate that additional steps and associated apparatus may be employed as required or desired in the simplified schematic of process 20 shown in FIG. 2. For instance, in the embodiment of FIG. 2, permeate 22p may have a lower acid concentration than desired and thus a concentration step might be employed to increase the acid concentration of the stream before recycling back to counter current decantation 4 or stripping step 7. FIG. 2c shows a simplified schematic of a portion of the hydrometallurgical process of FIG. 2 comprising such an optional additional step. Here, the undesirably dilute permeate 22p is supplied to concentrator 82 which outputs a higher concentration sulphuric acid stream 82c to be directed to counter current decantation 4 or stripping step 7 and a very dilute stream 82d (mainly water) which may be returned to the main process as water make-up (e.g. for counter current decantation 4) or may be recycled to combining/mixing step 23 as a diluent stream mixing with the pregnant solution. Concentrator 82 may for instance be a conventional sulphuric acid concentrator unit or alternatively a water removal subsystem, such as an osmotic membrane distillation or membrane distillation unit.

Returning to the improved process of FIG. 2, with regards to operating parameters, it is generally expected that high pressures would not be required for nanofiltration step 21, although using increased pressure and/or temperatures would be expected to improve performance. To increase recovery in nanofiltration step 22 however, the nanofiltration modules or units may be operated at higher pressures than a conventional 600 psi operating range. Certain chemically stable nanofiltration membrane types may be used for this step which can operate at pressures up to 1070 psi and temperatures up to 80° C. Further, one may consider adding a controlled amount of dilute sulphuric acid or water to the pregnant solution stream in different stages of a multiple-stage nanofiltration system in order to generate an acid concentration profile in the permeate stream produced where higher concentrated acid at the initial stages and lower acid concentration at the later stages of the NF system may be produced.

Instead of merely disposing of the retentate stream 21r from nanofiltration 21, steps may be taken to recover valuable components (e.g. metals) therein if their concentration is high enough, such as treating the solids precipitated during neutralizing to recover the valuable solids content before discharging the rest as sludge. Alternatively, it too may be directed back for counter current decanting at step 4 to improve plant efficiency. If however the retentate stream 21r from nanofiltration 21 is disposed of as shown, anti-scalant may be added to the raffinate stream upstream of nanofiltration step 21 in order to increase recovery and reduce the fouling of the nanofiltration membranes. Further, instead of using the permeate stream 22p from nanofiltration step 22 for counter current decanting as shown, this permeate stream may also be used elsewhere in overall process 20 as desired.

The arrangement in FIG. 2 thus not only provides for recovery of sulphuric acid and water from the raffinate stream, but also for recovery of sulphuric acid from the pregnant solution stream. Due to the high concentration of uranium and sulphuric acid in the pregnant solution stream after stripping 7, and thus the high osmotic pressure of the pregnant solution stream, using nanofiltration on the pregnant solution stream may not hitherto have been considered to be practical. However here, the permeate stream 21p from raffinate nanofiltration step 21 is advantageously employed to dilute the pregnant solution stream, thereby reducing the osmotic pressure and thus making nanofiltration of the pregnant solution stream practical.

Further advantages of such an arrangement include the potential for significant reduction in lime usage in neutralization step 8 and/or impurity precipitation step 9, in production of gypsum waste, and in the amount of effluent discharged to the environment. Further still, nanofiltration systems are typically more compact than conventional neutralization and precipitation apparatus. Thus, other advantages of the invention include potential reduction in the size of neutralization and/or precipitation apparatus and hence the overall plant, along with a reduction in associated cost.

Figure 3:
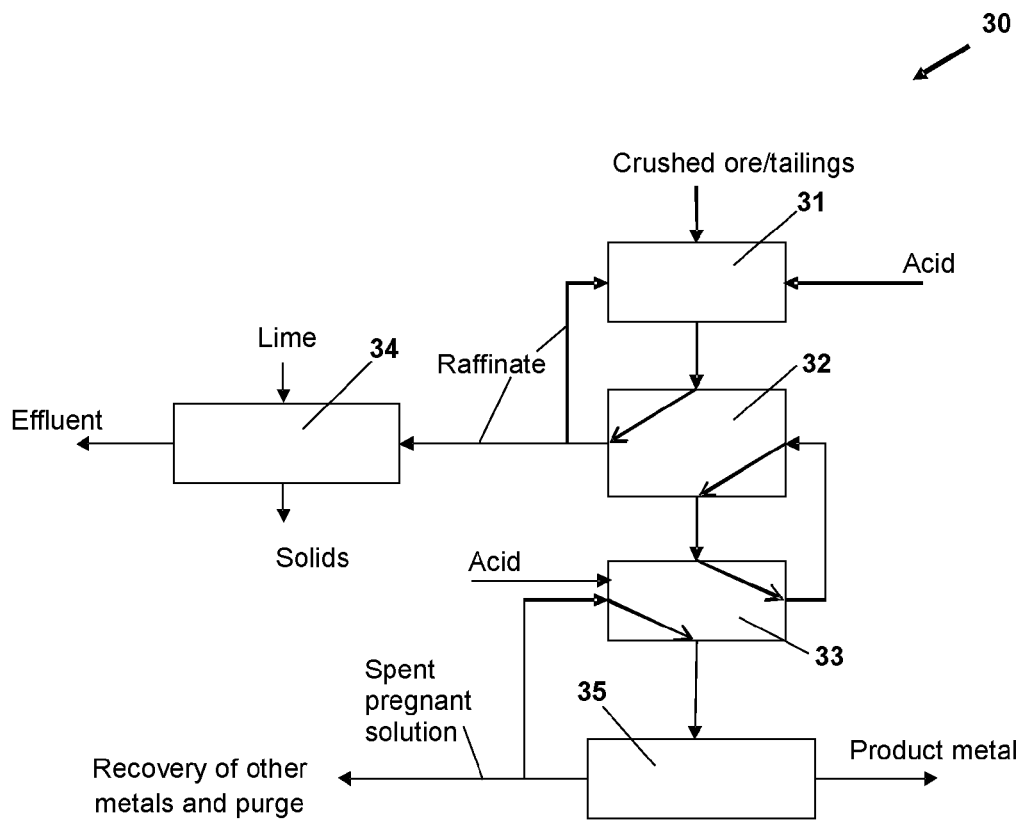
FIG. 3 shows a simplified schematic of a typical prior art hydrometallurgical process which involves recovering metal via electrowinning.

Other embodiments of the invention are exemplified in the following. For comparison, FIG. 3 shows a simplified schematic of a typical prior art hydrometallurgical process 30 which involves recovering metal via electrowinning. Specifically, process 30 involves subjecting an appropriate crushed ore or tailings to acid leaching 31 using supplied dilute sulphuric acid to create a leach solution comprising dissolved valuable metals and other liquid and solid impurities. The leach solution then undergoes a solvent extraction step 32. The solvent extracted leach solution, known as "pregnant extract", is then subjected to a stripping step 33 which again involves the addition of sulphuric acid and creates pregnant solution stream comprising concentrated valuable metals in solution.

As in the prior art process of FIG. 1, a portion of the raffinate from solvent extraction step 32 may be returned to the leaching step and part to neutralization step 34 for subsequent effluent treatment and disposal. The raffinate is first neutralized via addition of an appropriate amount of lime at neutralization step 34, and results in precipitated solids and an effluent liquid stream.

After stripping 33, the metals in the pregnant solution stream are recovered via electrowinning 35. The products of electrowinning 35 are the desired product metal and spent pregnant solution stream, also commonly referred to as spent electrolyte. A portion of the spent pregnant solution stream may be recycled for use in stripping step 33. And also spent pregnant solution stream may be used as purge or may be treated further in order to recover other metals therefrom.

Figure 4A:
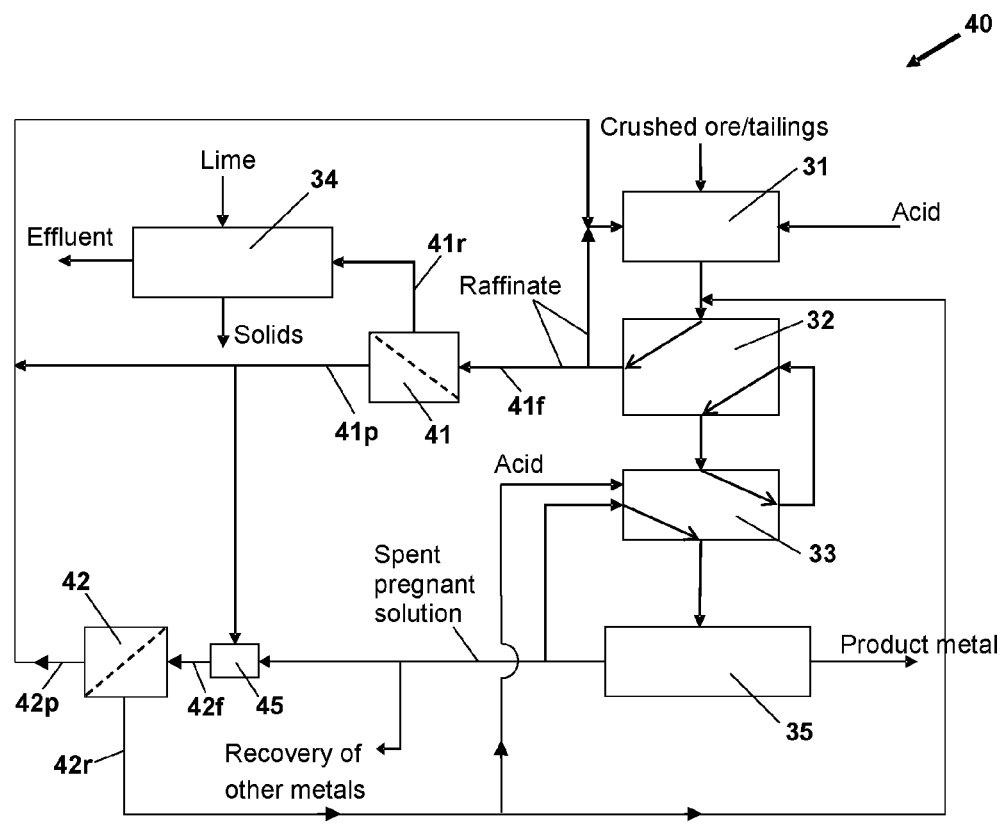
FIG. 4a shows a simplified schematic of a hydrometallurgical process of the invention which involves recovering metal via electrowinning.
Figure 4B:
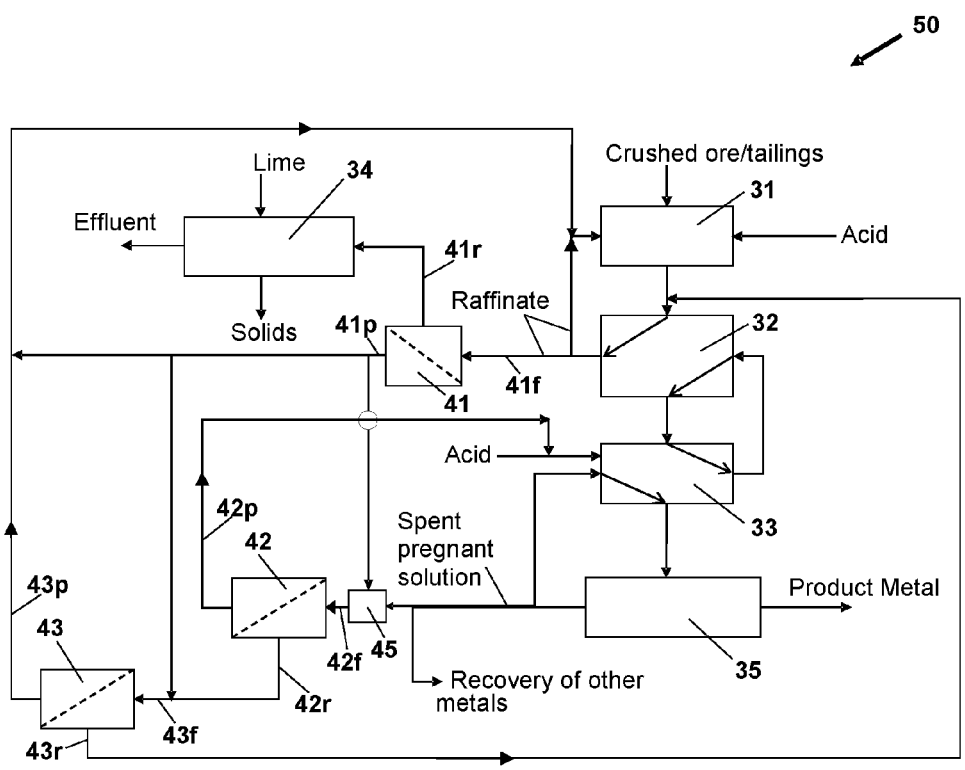
FIG. 4b shows a simplified schematic of an alternative hydrometallurgical process of the invention which involves recovering metal via electrowinning.

FIGS. 4a and 4b show alternative improved versions 40, 50 of the process of FIG. 3 in which two nanofiltration steps 41, 42 are employed. (The process steps common to FIG. 3 are identified with the same numerals.) Again here, a portion of the raffinate from solvent extraction step 32 is supplied as feed stream 41f and subjected to nanofiltration at step 41, while the remaining portion is recycled to leaching step 31. The ratio of the raffinate stream portions sent to these two steps may vary depending on the process design and equipment. In FIGS. 4a and 4b, the retentate streams 41r from nanofiltration step 41 are disposed of after first neutralizing them with lime at step 34.

In FIG. 4a, a portion of the permeate stream 41p from nanofiltration step 41 is combined and mixed with the spent pregnant solution stream after electrowinning at combining/mixing step 45, and thereby substantially dilutes the spent pregnant solution stream. The diluted spent pregnant solution stream then is supplied as feed stream 42f and undergoes nanofiltration at step 42. Another portion of the permeate stream 41p from nanofiltration step 41 is combined with the acid supplied to leaching step 31 and thus is used in leaching step 31.

The retentate stream 42r from nanofiltration step 42 is directed back in process 40 and is combined with the leach solution upstream of solvent extracting step 32. The permeate stream 42p from nanofiltration step 42 is combined with the portion of the permeate stream 41p from nanofiltration 41 which is being directed back and used in leaching step 31.

FIG. 4b shows an alternative embodiment to that shown in FIG. 4a and instead employs multiple nanofiltration steps to treat the diluted spent pregnant solution stream. The embodiment of FIG. 4b differs from that in FIG. 4a in that the retentate stream 42r from nanofiltration step 42 undergoes a subsequent nanofiltration at step 43. Here, the retentate stream 43r from nanofiltration step 43 is directed back in process 50 and is combined with the leach solution upstream of solvent extracting step 32. And, the permeate stream 43p from nanofiltration step 43 is combined with the portion of the permeate stream 41p from nanofiltration 41 which is being directed back and used in leaching step 31. Also here, the permeate stream 42p from nanofiltration step 42 is now combined with the acid supply used in stripping step 33. And a final difference is that a portion of the permeate stream 41p from nanofiltration step 41 is combined with the retentate stream 42r from nanofiltration step 42 upstream of additional nanofiltration step 43. An advantage of this embodiment is that by adding permeate from nanofiltration step 41 to the spent pregnant solution stream in stages as shown, an acid concentration profile can be generated in the permeates produced. For instance, higher acid concentration can be produced in the initial stage and lower concentrations in the later stage in the multiple nanofiltration process.

Again, other variations are possible with regards to processes 40, 50 exemplified in FIGS. 4a and 4b. implified schematic of process 20 shown in FIG. 2. For instance, the permeate stream 41p from nanofiltration step 41 may instead be considered for use in leaching step 31. And additional nanofiltration steps downstream of step 41 may be considered to treat the retentate stream 41r from nanofiltration step 41 to recover additional acid and water content therefrom.

The embodiments in FIGS. 4a and 4b thus provide for recovery of sulphuric acid and water from the raffinate stream and from the spent pregnant solution stream from electrolytic processing and thus reduce the acid requirement for the overall process. Further advantages again include the potential for significant reduction in lime usage, in production of gypsum waste, and in the amount of effluent and hazardous waste discharged to the environment. Also, they offer potential benefits with regards to the size of neutralization and other apparatus and associated cost.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. For instance, use of the invention for the treatment of industrial effluents and other process streams can also be considered. Such modifications are to be considered within the purview and scope of the claims appended hereto.

The invention claimed is:

1. A hydrometallurgical process for extracting a valuable metal from a material comprising the steps of:
   a) leaching the material with a lixiviant to produce a leach solution of the metal and impurity solids;
   b) concentrating and purifying the leach solution to produce a metal-rich pregnant solution stream and a metal-poor raffinate, wherein the step of concentrating and purifying the leach solution comprises solvent extracting the leach solution; and
   c) recovering the metal from the pregnant solution stream; characterized in that the hydrometallurgical process comprises:
   directing the raffinate from solvent extracting the leach solution to the inlet of a first nanofiltration subsystem to produce a first retentate stream and a first permeate stream;

combining the first permeate stream from the first nanofiltration subsystem with the pregnant solution stream;

directing the combined first permeate stream and pregnant solution stream to the inlet of a second nanofiltration subsystem to produce a second retentate stream and a second permeate stream; and employing the second permeate stream in at least one of steps a) and b).

2. The hydrometallurgical process of claim 1 comprising combining the first permeate stream from the first nanofiltration subsystem with the pregnant solution stream before recovering the metal from the pregnant solution stream.

3. The hydrometallurgical process of claim 1 comprising combining the first permeate stream from the first nanofiltration subsystem with the pregnant solution stream after recovering the metal from the pregnant solution stream.

4. The hydrometallurgical process of claim 1 wherein the material comprises ore or tailings.

5. The hydrometallurgical process of claim 1 wherein the lixiviant is an aqueous acid solution.

6. The hydrometallurgical process of claim 5 comprising:
neutralizing the first retentate stream with lime; and
discharging the neutralized first retentate stream as effluent.

7. The hydrometallurgical process of claim 5 wherein the valuable metal is uranium, the acid is sulfuric acid, and the hydrometallurgical process comprises:

counter current decanting the leach solution and impurity solids with a counter current decanting mixture comprising sulfuric acid and water to remove the solids;

combining the first permeate stream from the first nanofiltration subsystem with the pregnant solution stream obtained before recovering the metal therefrom;

employing the second permeate stream in the counter current decanting mixture;

chemically precipitating the uranium from the retentate stream of the second nanofiltration subsystem, thereby recovering and purifying the uranium.

8. The hydrometallurgical process of claim 5 wherein the step of recovering the metal comprises electrolytic processing the pregnant solution stream, and the hydrometallurgical process comprises:

combining the first permeate stream from the first nanofiltration subsystem with the pregnant solution stream obtained after recovering the metal therefrom by electrolytic processing;

combining the second retentate stream with the leach solution prior to the concentrating and purifying the leach solution step;

combining the second permeate stream with the aqueous acid solution in the leaching step.

9. A system for extracting a valuable metal from a material comprising:

apparatus for leaching the material with a lixiviant;

apparatus for concentrating and purifying the leach solution to produce a metal-rich pregnant solution stream and a metal-poor raffinate comprising a solvent extracting apparatus for solvent extracting the leach solution; and apparatus for recovering the metal from the pregnant solution stream;

characterized in that the system comprises:

a first nanofiltration subsystem comprising an inlet connected to the raffinate from the solvent extracting apparatus, a first retentate stream outlet, and a first permeate stream outlet connected to the pregnant solution stream; and a second nanofiltration subsystem comprising an inlet connected to the combined first permeate stream and pregnant solution stream, a second retentate stream outlet, and a second permeate stream outlet connected to at least one of the apparatus for leaching and the apparatus for concentrating and purifying the leach solution.

10. The system of claim 9 wherein the first permeate stream outlet is connected to the pregnant solution stream upstream of the apparatus for recovering the metal.

11. The system of claim 9 wherein the first permeate stream outlet is connected to the pregnant solution stream downstream of the apparatus for recovering the metal.

12. The system of claim 9 wherein the lixiviant is an aqueous acid solution.

13. The system of claim 12 comprising apparatus for neutralizing the first retentate stream comprising an inlet connected to the first retentate stream outlet, an inlet for lime, and an outlet for effluent.

14. The system of claim 12 wherein the valuable metal is uranium; the acid is sulfuric acid; the apparatus for concentrating and purifying the leach solution comprises apparatus for counter current decanting comprising an inlet for the leach solution and impurity solids, an inlet for sulfuric acid, an inlet for water, and an inlet for the second permeate stream; the apparatus for recovering the metal comprises apparatus for chemical precipitation connected to the retentate stream of the second nanofiltration subsystem; and the first permeate stream from the first nanofiltration subsystem is connected to the pregnant solution stream upstream of the apparatus for chemical precipitation.

15. The system of claim 12 wherein the apparatus for recovering the metal comprises apparatus for electrolytic processing; the first permeate stream from the first nanofiltration subsystem is connected to the pregnant solution stream downstream of the apparatus for electrolytic processing; the second retentate stream is connected to the leach solution upstream of the apparatus for concentrating and purifying the leach solution; and the second permeate stream is connected to the aqueous acid solution supplied to the apparatus for leaching.

* * * * *

UNITED STATES PATENT AND TRADEMARK OFFICE
CERTIFICATE OF CORRECTION

PATENT NO. : 10,174,404 B2
APPLICATION NO. : 14/422922
DATED : January 8, 2019
INVENTOR(S) : Siamak Lashkari et al.

Page 1 of 1

It is certified that error appears in the above-identified patent and that said Letters Patent is hereby corrected as shown below:

On the Title Page

Item (57) Abstract, Column 2, Line 5-6:
"treated in a nanofiltration subsystem" should read, --treated in a first nanofiltration subsystem--.

Signed and Sealed this
First Day of September, 2020

Andrei Iancu
*Director of the United States Patent and Trademark Office*